United States Patent Office 3,505,102
Patented Apr. 7, 1970

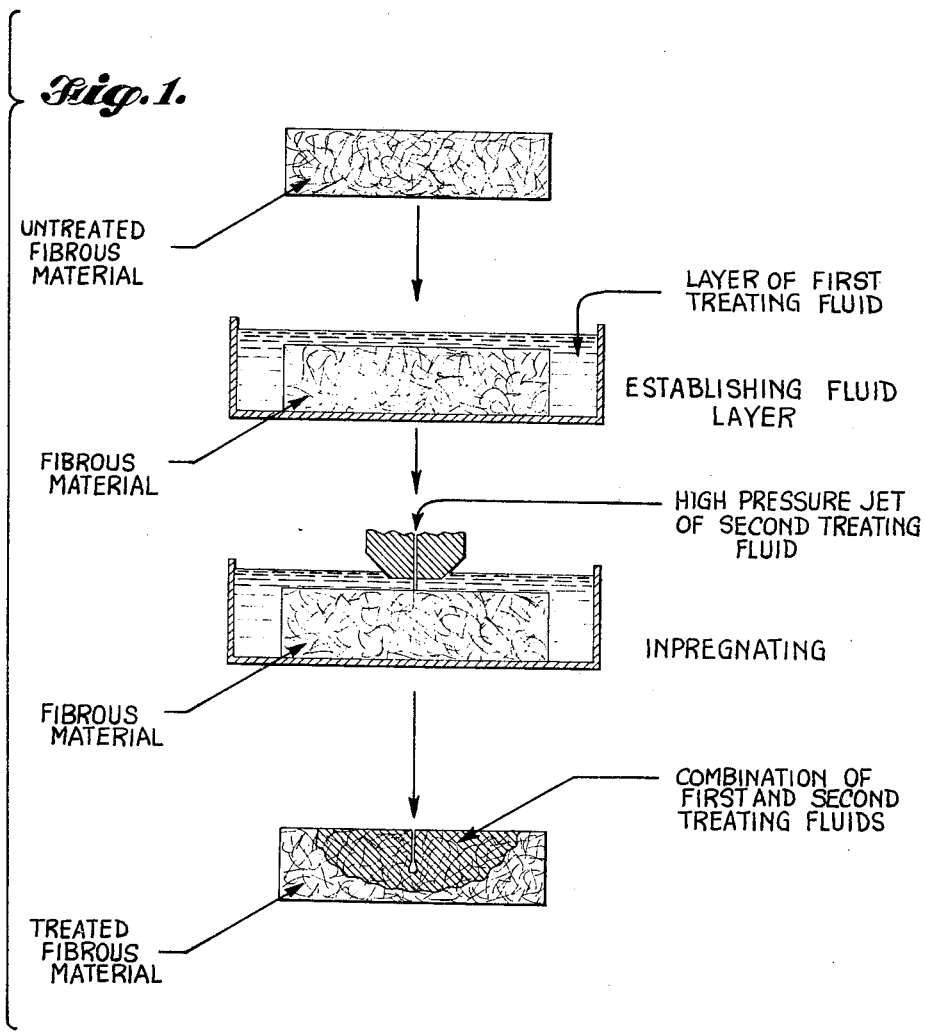

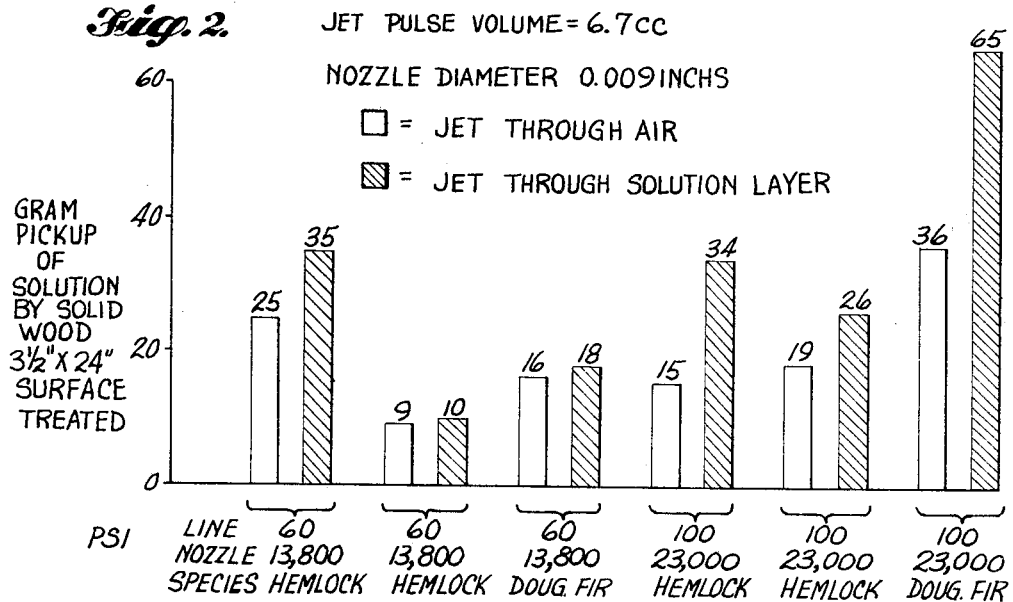
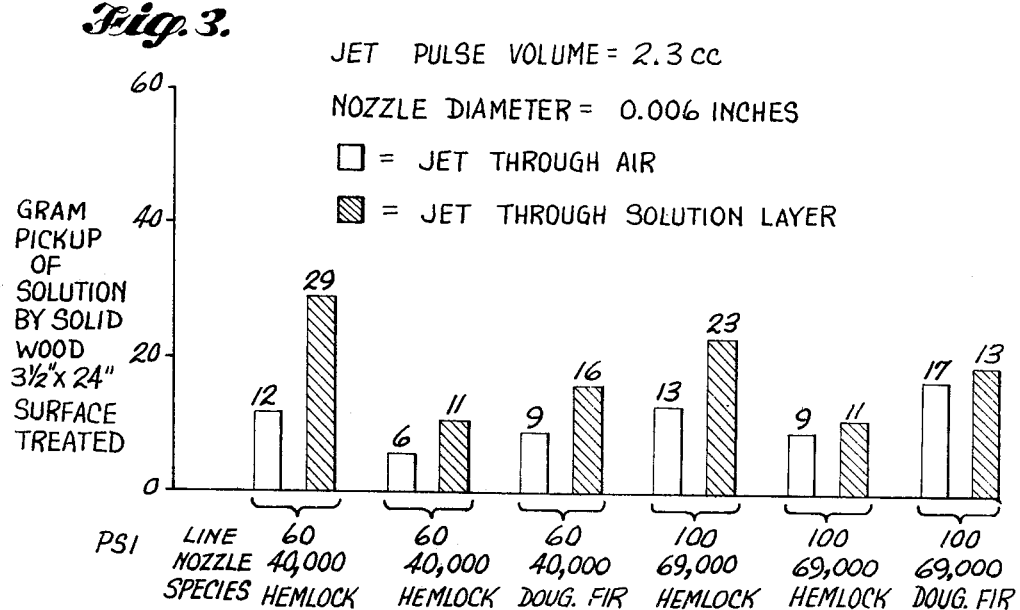

3,505,102
JET-THROUGH LIQUID IMPREGNATION METHOD
William T. Nearn, 1725 128th Ave. SE., Bellevue, Wash. 98004, and Robert W. Ramstad, 844 Iris Ave., Sunnyvale, Calif. 94086
Filed Aug. 15, 1967, Ser. No. 660,624
Int. Cl. B05c *8/06;* B27k *3/08;* B44d *1/12*
U.S. Cl. 117—113                                          4 Claims

ABSTRACT OF THE DISCLOSURE

A method of treating porous materials with treating fluids wherein the material is submerged in one fluid through which a high-pressure jet of another fluid is directed toward the material. The jet drills a hole into the material and impregnates the material in the area around the hole with a solution including both fluids.

CROSS-REFERENCE TO RELATED APPLICATION

While this application is directed to one method of increasing the level of treatment of porous materials impregnated by means of a fluid jet, another method for this same purpose is disclosed and claimed in the copending application having a common assignee, Ser. No. 677,708, filed Oct. 24, 1967, entitled "Method and Apparatus for Jet Impregnation." It is sufficient to relate that this copending application relates to the use of a disc, or some other surface sealing device, surrounding the jet nozzle to increase retention and improve distribution of the treating fluid obtained from any given jet pulse, as well as to reduce surface damage of the porous material.

BACKGROUND OF THE INVENTION

Field of the invention

This invention relates to a method for impregnating porous materials, such as wood, and it relates more particularly to a method of increasing the efficiency of introducing impregnates into such materials, as well as improving the retention and distribution of such treating fluids without increasing surface damage of the treated material.

DESCRIPTION OF THE PRIOR ART

The introduction of the requisite quantities of water-soluble fire-retardant or decay-inhibiting salts, or decay-inhibiting preservative oils and oil-borne preservatives into wood is commonly carried out as a batch process in closed pressure vessels using treating schedules of long duration (4 to 8 hours). The details of the pressure-treating process can be found in any standard book on wood treatment; for example, "Wood Preservation" by Hunt and Garatt, McGraw-Hill, New York, 1954.

For information on pressure vessel treatment, as well as other impregnation processes, a good source of information is the series of patents to Goldstein et al., and particularly U.S. Patent No. 2,917,408. The pressure vessel treatment is time consuming and inflexible in that it does not permit treatment of selected wood surfaces but requires that the entire piece be treated with no control of treatment distribution to match service requirements. It is a severe treatment that often results in degrade of manufactured products such as plywood and in any one treating cycle the entire cylinder load is exposed to degrade. Retort treatment using water soluble salts is not feasible for products such as interior plywood or urea bound particleboard. In addition, retort treatment of refractory species such as Douglas fir requires a pretreatment step known as incising in order to insure the required penetration and absorption. All products require some time of drying prior to retort treatment even though certain drying procedures are carried out in the treating cylinder. When water soluble salts are used, substantial quantities of water are introduced into the material and retained until removed in subsequent drying operations.

One method of placing a small hole into the surface of Douglas fir and other porous products is disclosed in the University of Michigan Thesis for PhD entitled "High Energy Liquid Jet as a New Concept for Wood Machining," by E. L. Bryan in 1963. This disclosure shows that a fluid pressure of 35,000 p.s.i. can be used with a nozzle having a diameter of 0.005" to penetrate directly into Douglas fir ¼" in a nominal jet action time of ½ second. During these penetration tests the jet fluid (water) was forced along the fiber direction and out the end grain of all specimens. This information shows that it is possible to use high pressure jets to simultaneously move a liquid into the surface of wood and along its grain beyond the point of entry. It is noted that the hole diameter is quite slight and would therefore not appreciably affect the appearance or strength of the workpiece.

In his article published in the August 1963 Forest Products Journal, volume XIII, No. 8, E. L. Bryan refers to the effect of the jet fluid in a cutting action as follows: "As dry wood is cut by the jet, material near the newly formed surfaces is immediately impregnated by the cutting fluid, . . . ." Apparently these observations led to the further work described in the U.S. Patent No. 3,318,-725 to E. L. Bryan, entitled "Method of Impregnation of Porous Materials, Apparatus Therefor, and Product Thereof." This patent discloses the many benefits of a jet impregnation treatment, including the small holes, the possibility of treating selected areas for partial treatments, and elimination of the long cycle times and physical facilities of previously known retort impregnation treating processes. A good disclosure of the types of products and treating fluids which can be successfully impregnated into porous materials by the high-pressure jets is included in this patent. In carrying out the process disclosed in the patent and as described in column 6, lines 41 to 54, the preferred spacing between the nozzles and the workpiece ranges between ⅛" to 1½".

While following the teachings of the Bryan patent, applicants have found that it is difficult to increase the amount of treating material that can be carried into the wood without increasing the size of the entrance hole to such a great extent that it affects its appearance and strength, or without distributing the treating fluid too deeply into the workpiece. By utilization of a high speed camera, a series of films of the jet cycle indicated that the thin layer of treating solution present on the workpiece, as a result of the prior jet streams, is blown away from the material by the initial jet action and that the penetration of the jet into the wood is not instantaneous, as it is necessary for the jet to accelerate to a velocity sufficient to penetrate into the wood. This acceleration phase consumes a portion of the jet volume and must be added to the volume of treating fluid needed per pulse, in order that adequate treatment retention results. Once the jet has broken into the wood, there is an almost instantaneous eruption of liquid from holes in the vicinity of the entrance jet. These holes may be either those cut by previous jet action or those developed as a result of planes of weakness within the porous material. The discharge of the treating material through these holes continues until the jet has been expended. In addition to these wastes of jet momentum and treating fluids, in some situations utilizing certain types of treating fluids there is a problem caused by nozzle plugging.

SUMMARY OF THE INVENTION

The present invention relates to an improved method of jet impregnation which increases the retention and effective distribution of the treating fluid without increasing the size of the surface holes or substantially increasing the depth of treatment penetration. In addition, by practicing the instant method, it is possible to eliminate the splashing of the treating fluid and to conserve the jet momentum during the initial stages of the jet action. It is also a feature of the instant process to provide a method permitting the combination of various treating solutions and to use treating solutions through the jet which will minimize the nozzle maintenance time due to plugging.

According to the invention, these various objects are obtained by placing the material to be treated under a layer of liquid and then directing the fluid jet through the layer into the material. The liquid layer may be the same or a different solution than that passing through the jet nozzle. This method substantially increases the amount of treating chemicals introduced into the material per pulse as compared with the Bryan method, wherein the jet is directed through the air in its path to the material being treated. The jet treatment fluid may be water or less concentrated treating fluid than the liquid layer over the material being treated. This virtually eliminates nozzle clogging. By adjustment of the relative physical characteristics of the layer fluid and the jet fluid, including their surface tension, density, viscosity and concentration of active materials, it is possible to provide a wide variety of porous material treated products.

These and other features and advantages of the invention will become more clearly apparent from the following detailed description thereof, which is to be read with reference to the accompanying drawings.

BRIEF DESCRIPTION OF THE DRAWINGS

In the drawings:

FIGURE 1 is a flow diagram of one illustrative embodiment of the process of this invention.

FIGURES 2 and 3 illustrate in bar graph form a comparison of treating agent retention of materials treated by a jet passing through the air and similar materials treated by the method of the instant invention.

DESCRIPTION OF THE PREFERRED EMBODIMENTS

The instant invention practices the methods for treating porous materials using similar equipment to that disclosed in the Bryan Patent No. 3,318,725. The nozzle sizes, pressures of the jets and compositions of the porous materials and treating agents are adequately described in this previously mentioned patent.

The main point of departure and improvement over the method previously known is the utilization of a fluid layer through which the jet fluid passes prior to and during the time that it impinges upon the material to be treated. With reference to FIGURE 1, it is noted that the untreated porous material is placed in a suitable tank containing a first treating fluid, which establishes a layer of the fluid over the surface of the porous material which is to be later subjected to the action of the high-pressure jet. The wide variety of porous materials with their various characteristics of surface hardness, internal structure and end uses, along with the wide variety of treating fluids which can be used in this process, makes it difficult to indicate with any specificity the thickness of the layer that must be established over the surface of the porous material. Experience has shown that for a typical fire-retardant solution, such as a 40% aqueous solution of monobasic ammonium phosphate, it is adequate to have a depth of the surface layer of 1" to 2" of thickness or more. The distance between the lowest point of the nozzle and the surface of the workpiece should be such that the nozzle is below the surface of the fluid layer. With such dimensions, a nozzle diameter of 0.009" and a nozzle pressure of 13,000 p.s.i., excellent penetration of the treating fluid is achieved. In orders of magnitude nozzles having diameters between 0.0035 to 0.01 inch or more have been used with good success, with nozzle pressures between 10,000 to 70,000 p.s.i.

To show the significance of the improved efficiency and treatment retention obtained by the instant invention, reference is had to FIGURES 2 and 3. These figures disclose in bar graph form the results obtained when comparing samples treated by the open-air jet system shown in the Bryan patent and the liquid-layer jet treatment described herein. In this particular set of examples, the layer thickness above the surface of the workpiece was between 1.5" and 1.7" with the distance between the base of the nozzle and the surface of the workpiece being equal to 0.2". Prior to jet treatment on one surface the solid wood samples of 3½" x 24" were end coated with paraffin to preclude the possibility of a soaking action as the explanation for additional pickup. In this case, the treating solution was identical in both the surface layer and that which passed through the jet nozzle. It should be noted when comparing chemical retention or gram pickup of the solution in the specimens that the average pickup of the jet through the solution layer is higher by a significant degree than it is in the pieces treated with the jet passing through air. Further, it is to be noted from FIGURES 2 and 3 that there is a greater pickup per pulse of the jet-through layer process over that attained with the jet-through air process. This would mean that utilizing less pump capacity and the liquid-layer method of the instant invention, it is possible to reach the same results provided by previously used jet-through air methods utilizing larger pump capacity.

Other tests have shown that when water is used as the fluid passing through the jet nozzle and the fluid layer is composed of a treating fluid, the treating solution is carried down into the hole produced in the porous material by the action of the jet. Whether this is as a result of shock waves caused by the water jet or a venturi action is not clear. X-rays of the treated materials indicate that those treated under the fluid layer have improved distribution over that attained with similar specimens treated in jets passing through air. High speed motion pictures of the submerged jet through the layer have been taken, and there is no indication of the jet emerging from the workpiece in the manner previously observed with the jet passing through the air.

It is therefore seen that by the method of the instant invention it is possible to increase the weight pickup or treatment retention of the treating material, along with improved distribution of the treating material, while at the same time maintaining the same size of surface holes. In addition, the splashing and loss of treating solution that is experienced when the jet is passed through air is eliminated. By the provision of two different fluids, one passing through the jet nozzle and the other providing the surface layer, it is possible to develop a series of combinations of resulting treatments.

What is cliamed is:

1. A method of treating porous material with treating liquids comprising the steps of:
 (a) establishing a layer of a first treating liquid over one surface of the material being treated; and (b) directing a high-pressure jet of a second treating liquid through said layer toward said surface until a hole is formed in said material, permitting said first and second treating liquids to impregnate said material in the volume surrounding said hole.

2. The method of claim 1 wherein said porous material is wood.

3. The method of claim 1 wherein said jet exits from a nozzle which is immersed in said layer.

4. The method of claim 1 wherein said jet exits from a nozzle with an orifice diameter of between 0.0035" to 0.01".

References Cited

UNITED STATES PATENTS 3,318,725   5/1967   Bryan _____ 117—58 X

ALFRED L. LEAVITT, Primary Examiner

T. E. BOKAN, Assistant Examiner

U.S. Cl. X.R.

21—7; 117—105.5, 116, 147